Figure 1:
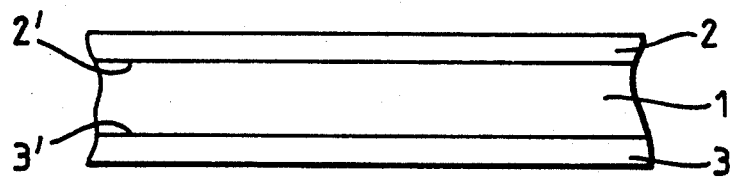

United States Patent [19]

Nelson et al.

[11] Patent Number: 5,204,180
[45] Date of Patent: Apr. 20, 1993

[54] MULTIPLE-LAYER POLYOLEFIN FILMS

[75] Inventors: Charles R. Nelson, Cheshire; Robert E. Slater, Welwyn, both of England

[73] Assignee: Imperial Chemical Industries PLC, London, England

[21] Appl. No.: 828,442

[22] Filed: Jan. 31, 1992

[30] Foreign Application Priority Data

Jan. 31, 1991 [GB] United Kingdom ............... 9102122

[51] Int. Cl.$^5$ ............................................. C09J 7/02
[52] U.S. Cl. ................................... 428/349; 428/354; 428/355; 428/518; 427/208
[58] Field of Search ............... 428/349, 354, 355, 518; 427/208

[56] References Cited

U.S. PATENT DOCUMENTS

| | | |
|---|---|---|
| 4,320,175 | 3/1982 | Hisazumi ............................ 428/518 |
| 4,495,027 | 1/1985 | Wagner .............................. 428/518 |
| 4,565,743 | 1/1986 | Akao ................................. 428/518 |
| 4,631,235 | 12/1986 | Biale ................................ 428/518 |
| 4,681,803 | 7/1987 | Liu .................................. 428/518 |
| 5,019,447 | 5/1991 | Keller ............................... 428/518 |
| 5,030,511 | 6/1991 | Moffitt .............................. 428/518 |

Primary Examiner—Jenna L. Davis
Attorney, Agent, or Firm—Cushman, Darby & Cushman

[57] ABSTRACT

A multiple-layer film comprises an oriented propylene polymer substrate having on opposed surfaces thereof, respectively, a first vinylidene halide copolymer having a Tg of up to 25° C. and a molecular weight not exceeding 135,000 and a second vinylidene halide copolymer having a Tg greater than that of the first copolymer.

Such films offer excellent sealing profile, blocking resistance, gas-barrier, humid ageing and printing characteristics.

9 Claims, 1 Drawing Sheet

MULTIPLE-LAYER POLYOLEFIN FILMS

This invention relates to a polyolefin film and, in particular, to a multiple-layer polyolefin film.

The packaging industry requires large quantities of heat-sealable film, which can be exposed to temperatures at which the film can be sealed to itself without impairment of the film integrity. Polyolefins are in demand as film-forming materials by virtue of their strength and clarity but, in general, exhibit relatively poor heat-sealing characteristics. Attempts to improve the latter usually involve the creation of a composite, multiple-layer film structure having a relatively poorly sealable polyolefin film base and a surface layer of a heat-sealable material which can be melted or partially melted at a temperature below that at which the polyolefin begins to soften. To be effective, this layer of heat-sealable material must be sealable over a relatively wide temperature range, must adhere securely to the film base, and must be sealable to itself to provide a bond of adequate strength—usually referred to as the heat-seal strength.

The nature of the heat-sealable material is generally such that the resultant film exhibits the phenomenon of "blocking" in which undesirable adhesion occurs between two layers of film placed in contact under moderate pressure, as may arise during processing, use or storage of the film. Such films do not perform well on film-handling equipment, and attempts to peel apart adjacent layers of blocked film may severely damage the film surface.

The susceptibility of a film to blocking may be reduced by incorporation into the film of a particulate additive, such as silica and/or alumina, having an average particle size of up to about 20 $\mu$m. However, adoption of such measures is usually observed to detract from other desirable film characteristics, such as optical clarity, colour and printability, while the presence of particulate additives may generate an unacceptable accumulation of abrasive debris on, and around, the film handling equipment. In general, measures adopted to inhibit blocking usually adversely affect the heat-sealing characteristics of the film, particularly the sealing range and threshold temperature.

There is also a need for heat-sealable films to exhibit adhesion to printing inks used in the packaging industry. Unfortunately, heat-sealable materials often have relatively poor ink adhesion properties.

We have now devised a multiple-layer film which reduces or substantially eliminates one or more of the aforementioned problems.

Accordingly, the present invention provides a multiple-layer film comprising a substrate layer of polyolefin and, on at least one surface thereof, a polymeric heat-sealable layer wherein a) the substrate, having opposed first and second surfaces, comprises a layer of an oriented propylene polymer, having b) associated with the first surface of the substrate, a layer of a first vinylidene halide copolymer having a glass transition temperature (Tg) of up to 25° C. and a molecular weight (weight average) not exceeding 135,000, and c) associated with the second surface of the substrate, a layer of a second vinylidene halide copolymer having a glass transition temperature (Tg) greater than that of the first copolymer.

The invention further provides a method of producing a multiple-layer film comprising a substrate layer of a polyolefin and, on at least one surface thereof, a polymeric heat-sealable layer by a) forming a substrate comprising a layer of an oriented propylene polymer having opposed first and second surfaces, and providing thereon b) associated with the first surface of the substrate, a layer of a first vinylidene halide copolymer having a glass transition temperature (Tg) of up to 25° C. and a molecular weight (weight average) not exceeding 135,000, and c) associated with the second surface of the substrate, a layer of a second vinylidene halide copolymer having a glass transition temperature (Tg) greater than that of the first copolymer.

The invention still further provides a package comprising an article, wrapped in a film as hereinbefore defined.

A multiple-layer film as hereinbefore defined is "self-supporting" in the sense that it is capable of independent existence in the absence of a supporting base.

The propylene polymer forming the oriented substrate layer is suitably a propylene homopolymer or a propylene-olefin copolymer. In particular, the substrate for a packaging film conveniently comprises either a propylene homopolymer or a propylene-olefin block copolymer containing up to 15%, by weight of the copolymer, of at least one copolymerisable olefin—such as ethylene.

If desired, the substrate layer of a film according to the invention may comprise a composite, multiple-layer structure. For example, a suitable substrate comprises a core layer of a propylene polymer having on opposed surfaces thereof a polymeric receptive layer. Such a receptive layer suitably comprises an essentially olefinic polymer, such as an ethylene-propylene block copolymer, an ethylene—mono alpha olefin random copolymer containing from 1 to 15% by weight of the copolymer of a mono alpha olefin, the molecule of which contains from 3 to 10 carbon atoms, or a blend of such polymers. A linear low density ethylene polymer (LLDPE) ie a linear copolymer of ethylene and a higher olefin, the copolymer comprising at least 90% of ethylene by weight and having a density of from about 0.91 to 0.94 g/cc, is particularly suitable for use as a receptive layer, A preferred receptive layer comprises a linear ethylene-octene-1 copolymer having a density of 0.935 g/cc.

Formation of a composite film substrate layer is conveniently effected by any of the laminating or coating techniques employed in the films art. Preferably, however, the receptive layer is applied to the base or core layer by a coextrusion technique in which the polymeric components of the core and receptive layers are coextruded into intimate contact while each is still molten. Preferably, the coextrusion is effected from a multichannel annular die such that the molten polymeric components constituting the respective individual layers of the composite substrate merge at their boundaries within the die to form a single composite structure which is then extruded from a common die orifice in the form of a tubular extrudate.

The first vinylidene halide copolymer suitably comprises a vinylidene chloride copolymer having a glass transition temperature (Tg) of up to 25° C., preferably from 15° to 25° C., and particularly preferably from 18° to 22° C., for example—of about 20° C. Adjustment of Tg may be effected either by altering the comonomer content of the copolymer, a reduction in vinylidene halide content yielding an increase in Tg, or by appropriate selection of the comonomer.

A suitable comonomer for inclusion in the first vinylidene halide copolymer includes a lower alkyl acrylate, particularly that in which the alkyl group contains from 1 to 5 carbon atoms, and especially methyl acrylate or ethyl acrylate.

The molecular weight (weight average) of the first vinylidene halide copolymer should not exceed 135,000 and, preferably is within a range of from 75,000 to 135,000, particularly from 115,000 to 125,000.

Suitably, the vinylidene halide content of the first copolymer is within a range of from 85 to 90% by weight thereof, but, to decrease the risk of film blocking on storage, the vinylidene halide content is preferably towards the upper end of that range, for example—from 87.5 to 90% by weight. Similar levels of vinylidene halide content are desirable to ensure an acceptably low heat seal threshold temperature, ie the minimum sealing temperature at which heat-seals fabricated under standard conditions attain a level of 200 g/25 mm. Thus, a particularly suitable first copolymer conferring a low sealing threshold temperature and a wide sealing range, comprises a vinylidene chloride-methyl acrylate copolymer (VdC:MA; 89:11 w/w) having a weight average molecular weight of 120,000.

To inhibit inter-leaf tack, as hereinafter defined, the first vinylidene halide copolymer should be crystallisable, and the applied copolymer layer desirably should develop a degree of crystallinity (measured by a conventional infra-red absorption technique at a wavelength of 601 cm$^{-1}$) of at least 3.0% on storage. Preferably, after storage for at least 24 hours the first copolymer layer on the substrate should exhibit a degree of crystallinity of at least 6%, more preferably less than 30%, particularly from 15 to 25%, and especially of about 25%.

Application of the first copolymer to the film substrate, oriented and optionally heat-set as hereinafter defined, may be effected by conventional coating techniques from a solution or dispersion of the copolymer in a suitable solvent or dispersant. An aqueous latex, prepared by polymerising the monomeric constituents of the copolymer in aqueous emulsion in the presence of an appropriate emulsifying agent is a particularly preferred medium from which the copolymer may be applied.

The second vinylidene halide copolymer suitably comprises a vinylidene chloride copolymer having a glass transition temperature (Tg) greater than that of the first copolymer. Desirably, the Tg should be in a range of from greater than 25° C. to about 50° C., particularly from 35° to 45° C., and especially of about 40° C. Adjustment of Tg may be effected, in similar manner to that of the first copolymer by appropriate selection of the comonomer or the content thereof.

A suitable comonomer for inclusion in the second copolymer includes a lower alkyl methacrylate, particularly one in which the alkyl group contains from 1 to 5 carbon atoms, and especially methyl or ethyl methacrylate. Acrylonitrile is a particularly preferred comonomer.

The molecular weight (weight average) of the second copolymer may vary over a wide range and, if desired, may exceed that of the first. Desirably, the molecular weight is in a range of from greater than 135,000 to 250,000, preferably from 150,000 to 225,000 and, especially of about 200,000.

The vinylidene halide content of the second copolymer, like that of the first copolymer, is suitably within a range of from 85 to 90% by weight thereof, and preferably towards the upper end of that range. Thus, a particularly preferred second copolymer comprises a vinylidene chloride-acrylonitrile copolymer (Vdc:AN; 88:12 w/w) having a weight average molecular weight of 200,000.

Crystallinity of the second copolymer is of importance in contributing to a reduction in the inter-leaf tack characteristics of the resultant film. Desirably, therefore, the second applied copolymer layer should be crystallisable, preferably developing a degree of crystallinity, as herein defined, of at least 3.0% on storage for at least 24 hours. Preferably after storage for at least 24 hours the applied copolymer layer should exhibit a degree of crystallinity of from 10 to 15%, especially about 12%.

Application of the second copolymer to the substrate may, in the manner of the first copolymer, be effected by conventional techniques from a solution or dispersion, particularly from an aqueous latex medium.

If desired, blocking resistance of a film according to the invention may be improved by incorporation, into one or each of the vinylidene halide copolymer layers, of a conventional inert particulate additive, preferably having an average particle size of from 0.25 to 4.5 $\mu$m, and particularly preferably from 0.75 to 3.0 $\mu$m. Decreasing the particle size improves the gloss of the film.

The amount of additive, preferably spherical, incorporated into each copolymer layer is desirably in excess of 0.05%, preferably between 0.1 and 0.5%,-for example, about 0.15%, by weight of the copolymer.

An inert particulate additive for inclusion in the copolymer layer(s) may comprise an inorganic or an organic additive, or a mixture of two or more such additives.

Suitable particulate inorganic additives include inorganic fillers, and particularly metal or metalloid oxides, such as alumina and silica. Solid or hollow, glass or ceramic micro-beads or micro-spheres may also be employed.

A suitable organic additive comprises particles, preferably spherical, of an acrylic and/or methacrylic resin comprising a polymer or copolymer of acrylic acid and/or methacrylic acid and/or a lower alkyl (up to 6 carbon atoms) ester thereof. Such resins may be cross-linked, for example—by the inclusion therein of a cross-linking agent, such as a methylated melamine-formaldehyde resin. Promotion of cross-linking may be assisted by the provision of appropriate functional groupings, such as hydroxy, carboxy and amido groupings, in the acrylic and/or methacrylic polymer.

If desired, the or each vinylidene halide copolymer layer may also comprise a slip agent, such as a wax, typically in an amount of from 0.5 to 5.0%, especially from 1.5 to 2.5%, by weight of the copolymer.

Adhesion of the first and/or second copolymer layer(s) to the film substrate may be improved, if desired, by providing on the substrate a layer of an appropriate priming medium before deposition thereon of the copolymer medium. An acrylic priming medium particularly suitable for this application, especially an interpolymerised condensation resin prepared either as described in GB-A-1134876, by condensing a monoaldehyde with an interpolymer of acrylamide or methacrylamide with at least one other unsaturated monomer, or, as described in GB-A-1174328, by condensing a monoaldehyde with acrylamide or methacrylamide, and subsequently interpolymerising the condensation product with at least one other unsaturated monomer, the condensation reaction being effected in both cases in the presence of an alkanol containing from one to six carbon atoms.

A substrate film of the invention, prior to deposition of the vinylidene halide copolymer coating layer(s), is oriented by stretching at a temperature above the glass transition temperature of the polymer(s). For example, orientation of a film having a propylene homopolymer substrate layer is conveniently effected at a temperature within a range of from about 145° to 165° C. Orientation may be effected uniaxially, by stretching the film in one direction, or biaxially, by stretching the film in each of two mutually perpendicular directions in the plane of the film, and the biaxial orientation may be balanced or unbalanced, for example with the higher degree of orientation of an unbalanced film in a preferred direction—usually the transverse direction. Conveniently, the polypropylene substrate material and the receptive layer medium (if employed) are coextruded in the form of a composite tube which is subsequently quenched, reheated, and then expanded by internal gas pressure to induce transverse orientation, and withdrawn, at a rate greater than that at which it is extruded, to stretch and orient it in the longitudinal direction. Alternatively, a flat, multiple-layer film may be oriented by simultaneous or sequential stretching in each of two mutually perpendicular directions by means of a stenter, or by a combination of draw rolls and a stenter.

The degree to which the film substrate is stretched depends to some extent on the ultimate use for which the film is intended, but for a polypropylene-based packaging film satisfactory tensile and other properties are generally developed when the film is stretched to between three and ten, preferably, seven, times its original dimensions in each of the transverse and longitudinal directions.

After stretching, the polymeric film substrate is normally "heat-set", while restrained against shrinkage or even maintained at constant dimensions, at a temperature above the glass transition temperature of the polymer and below its melting point. The optimum heat-setting temperature can readily be established by simple experimentation, and for a polypropylene substrate layer, "heat-setting" is conveniently effected at temperatures in the range of from 100° C. to 160° C. Heat-setting may be effected by conventional techniques—for example by means of a stenter system, or by a system of one or more heated rollers as disclosed, for example, in GB-A-1124886. Alternatively, or additionally, the film may be subjected to a constrained heat treatment of the kind described in EP-A-23776.

Composite multiple-layer films in accordance with the invention may be prepared in a range of thicknesses governed primarily by the ultimate application for which a particular film is to be employed. Films, having a total thickness in a range extending from 2.5 to 100 μm are of general utility, but for packaging applications we prefer to employ a film of from about 10 to 50 μm in total thickness.

The thickness of each of the vinylidene halide copolymer layers should be at least 0.05 μm and preferably, for reasons of economy, should not greatly exceed about 2.5 μm, a particularly suitable range of thickness being from 0.75 to 1.0 μm, especially 0.9 μm.

If desired, for example to improve adhesion, a surface of a substrate film for use in accordance with the invention may be subjected to a chemical or physical surface-modifying treatment, a preferred treatment, because of its simplicity and effectiveness, being to subject the film surface to a high voltage electrical stress accompanied by corona discharge.

One or more of the layers of a composite film of the invention may conveniently contain any of the additives conventionally employed in the manufacture of thermoplastics films. Thus, additives such as dyes, pigments, lubricants, anti-static agents, anti-oxidants, surface-active agents, stiffening aids, slip aids, gloss-improvers, prodegradants, and ultra-violet light stabilisers may be employed.

Composite films prepared in accordance with the invention are heat-sealable at comparatively low temperatures, for example at temperatures of the order of 85° C. and lower, to provide a strong, hermetic seal. In addition, the heat-sealable coating adheres securely to the substrate material. In particular, the films exhibit excellent resistance to blocking on the reel and to inter-leaf tack, and have excellent sealing profile, hot tack and humid ageing characteristics and good gas barrier properties.

The following test methods are employed in assessing films according to the invention:

(a) Heat-Seal Strength

Two strips of a multiple-layer film having at least one heat-sealable surface layer are placed with the heat-sealable surfaces in contact with each other, and the ends of the strips sealed together between the jaws of a Sentinel Heat Sealer, Model No 12AS, only one jaw of the unit being heated. The strength of the seal is measured by cutting from the sealed-together strips of film, which have been allowed to cool to ambient temperature, a strip 25 mm wide and some 100 mm long, the heat seal extending across the entire width of the strip and having an area of some 25×25 mm. The unsealed ends of the strip are then attached respectively to a dynamometer and a gripping surface, a load is applied to the gripping surface, and the load required to separate the strips in the sealed area, at a rate of 30.5 cm per minute, is recorded by the dynamometer, and expressed as a seal strength of x g/25 mm, where x is the load in grammes.

(b) Heat Seal Threshold

To assess Heat Seal Threshold (HST), the minimum temperature at which a seal strength of 200 g/5 mm is achieved, samples of film are sealed together on a Sentinel Heat Sealer, Model No 12AS, operating at a jaw pressure of 15 psi (0.1 $MNm^{-2}$) and jaw closure time of 2 seconds, the temperature of the heated jaw being progressively increased from 80° C. in steps of 5° C. for successive film samples. From a plot of measured seal strength against jaw temperature for a series of test samples the relevant HST is determined by inspection.

(c) Blocking

Two or more strips of film, each about 75×150 mm, are placed in surface contact between glass plates under a load of 350 $kgm^{-2}$ and maintained at a temperature of 70° C. for 3 hours. On cooling to ambient temperature the force required to separate adjacent strips of film is measured by means of a Blocking Balance and expressed in units of g/75 mm width.

(d) Inter-Leaf Tack

Two strips of film, each about 75×150 mm, are placed in surface contact and stored, without external loading, at a temperature of 38° C. and 90% Relative Humidity for 28 days then manually peeled apart. Interleaf tack is assessed subjectively on a scale of from 0 to 10, 0 indicating no observable adhesion between the strips and 10 indicating virtually complete adhesion such that the strips cannot be separated.

(e) Ink Adhesion

The test ink was produced by adding one volume of Lorilleux Stilleto White Ink to one volume of a 1:1 mixture of ethyl acetate and industrial methylated spirits. The test ink had a viscosity of 22 seconds as measured in a Sheen No 2 viscosity cup. The test ink was coated using a No 2K bar onto one heat-sealable surface layer of the multiple-layer film, and allowed to dry in an oven at 70° C. for 2 minutes. DRG "Sellotape" adhesive tape was pressed onto the ink surface by using two passes of a roller. The film sample was lift for half an hour, after which time the tape was removed by pulling at 180° with a brisk snatch type action. The % amount of ink remaining on the heat-sealable surface layer was assessed visually.

The invention is illustrated by reference to the accompanying drawings in which:

FIG. 1 depicts a side elevation, not to scale, of a portion of a multiple layer film having an oriented propylene polymer substrate 1 and, on opposed surfaces $2^1$ and $3^1$ thereof respectively, a layer 2 of a first vinylidene halide copolymer and a layer 3 of a second vinylidene halide copolymer.

Figure 2:
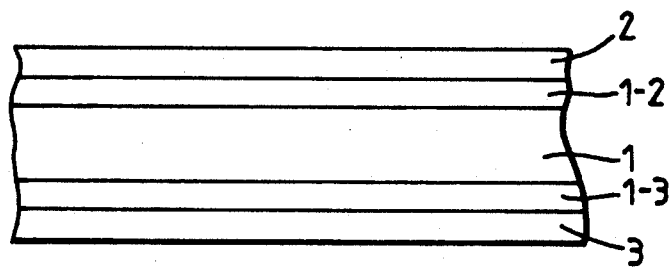

FIG. 2 depicts a side elevation of a similar film portion in which the substrate is a composite film having, on respective surfaces of a core layer 1, a LLDPE layer 1-2 and 1-3.

Figure 3:
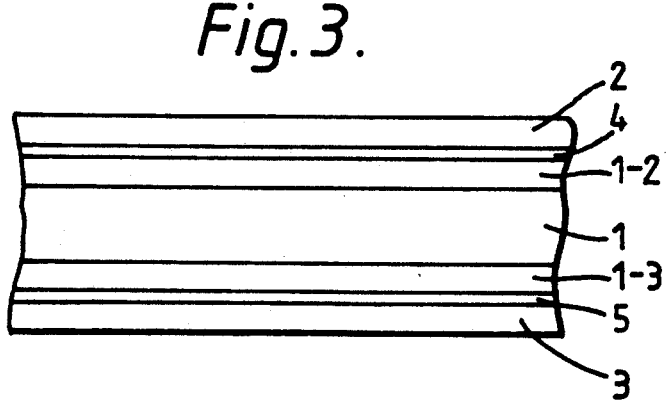

FIG. 3 depicts a side elevation of a similar film portion in which each surface of the composite film substrate has been additionally provided with a layer of a priming medium 4, 5 respectively.

The invention is further illustrated by reference to the following Examples:

EXAMPLE 1

From a triple channel annular die were coextruded a propylene homopolymer and a LLDPE (ethylene-octene-1; density 0.935 gcc) composition to form a polypropylene tube the internal and external surfaces of which were coated with a layer of the LLDPE composition.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form flat film which was subsequently heat-set at a temperature of 120° C. on a matt-surfaced roller heat-setter of the kind described in GB-A-1124886.

Discharge treatment of the heat-set film was effected by a single aluminium rod electrode extending across the entire width of the film, and connected to a Sherman GT60, 6 kilowatts, solid state corona treater, operating at 2 amps.

The thickness of the LLDPE layer on each surface of the resultant film was 0.45 μm, the substrate having a thickness of about 25 μm.

Each surface of the composite film was then primed with a layer of an acrylic primer and dried in an air oven at a temperature of 110° C.

To one surface (side A) of the primed film was applied an aqueous latex comprising a vinylidene chloride-methyl acrylate copolymer (89:11 w/w) of molecular weight (weight average) 120,000 and Tg≈20° C., and the coated film was dried in an air oven at a temperature of 85° C.

To the other surface (side B) of the primed film was applied an aqueous latex of a vinylidene chloride-acrylonitrile copolymer (88:12 w/w) of molecular weight (weight average) 200,000 and Tg≈40° C., and the coated film was dried in an air oven at a temperature of 80° C.

The thickness of each vinylidene chloride copolymer layer was approximately 0.9 μm.

The degree of crystallinity of each copolymer layer was determined by a standard technique, after storage of the film for at least 24 hours, and found to be 25% for side A and 12% for side B.

Samples of the film were heat-sealed on a Sentinel Heat Sealer, Model No 12AS, operating at a jaw pressure of 15 psi (0.1 $MNm^{-2}$), a jaw closure time of 2 seconds, and a jaw temperature of 130° C.

Film assessed in accordance with the aforementioned test procedures exhibited the following characteristics:

| | |
|---|---|
| Heat Seal Strength (A:A) | 500 g/25 mm |
| Initial Blocking Resistance (A:A) | 15 g/75 mm |
| Inter-leaf Tack (A:A) | 0 |
| Heat Seal Threshold (A:A) (200 g/25 mm) | 87° C. |
| Ink Adhesion (A) | 90% |
| Ink Adhesion (B) | 95% |

EXAMPLE 2

This is a comparative example not according to the invention. The procedure of Example 1 was repeated except that the vinylidene chloride-acrylonitrile copolymer applied to side B of the primed film in Example 1 was applied to both surfaces A and B of the primed film, i.e. the resultant multiple-layer film had heat-sealable layers of the same composition on both sides of the polypropylene substrate layer.

The degree of crystallinity of the copolymer layer(s) was determined by a standard technique, after storage of the film for at least 24 hours, and found to be 12%.

Film assessed in accordance with the aforementioned test procedures exhibited the following characteristics:

| | |
|---|---|
| Heat Seal Strength | 400 g/25 mm |
| Heat Seal Threshold (200 g/25 mm) | 110° C. |
| Ink Adhesion | 95% |

EXAMPLE 3

This is a comparative example not according to the invention. The procedure of Example 1 was repeated except that an aqueous latex comprising a vinylidene chloride-methyl acrylate copolymer (91.7:8.3 w/w) of molecular weight (weight average) 175,000 and Tg≈19.5° C. was applied to both surfaces A and B of the primed film, i.e. the resultant multiple-layer film had heat-sealable layers of the same composition on both sides of the polypropylene substrate layer. The coated film was dried in an air oven at a temperature of 85° C.

The degree of crystallinity of the copolymer layer(s) was determined by a standard technique, after storage of the film for at least 24 hours, and found to be 25%.

Film assessed in accordance with the aforementioned test procedures exhibited the following characteristics:

| Heat Seal Strength | 400 g/25 mm |
| --- | --- |
| Heat Seal Threshold (200 g/25 mm) | 100° C. |
| Ink Adhesion | 40% |

The above examples illustrate the improved properties of multiple-layer films according to the invention.

We claim:

1. A multiple-layer film comprising a substrate layer of a polyolefin and, on at least one surface thereof, a polymeric heat-sealable layer characterised in that:
    a) the substrate, having opposed first and second surfaces, comprises a layer of an oriented propylene polymer, having
    b) associated with the first surface of the substrate, a layer of a first vinylidene halide copolymer having a glass transition temperature (Tg) of up to 25° C. and a molecular weight (weight average) not exceeding 135,000 and
    c) associated with the second surface of the substrate, a layer of a second vinylidene halide copolymer having a glass transition temperature (Tg) greater than that of the first copolymer.

2. A film according to claim 1 wherein each of the first and second vinylidene halide copolymers is a vinylidene chloride copolymer.

3. A film according to claim 2 wherein the first vinylidene chloride copolymer comprises from 87.5 to 90% by weight of vinylidene chloride.

4. A film according to claim 1 wherein the first vinylidene halide copolymer comprises, as comonomer, a lower alkyl acrylate.

5. A film according to claim 1 wherein the first vinylidene halide copolymer layer exhibits a degree of crystallinity of at least 3%.

6. A film according to claim 1 wherein the glass transition temperature (Tg) of the second vinylidene halide copolymer is within a range of from 25° to 50° C.

7. A film according to claim 1 wherein the second vinylidene halide copolymer comprises a comonomer selected from the group consisting of acrylonitrile and a lower alkyl methacrylate.

8. A film according to claim 1 wherein the second vinylidene halide copolymer layer exhibits a degree of crystallinity of at least 3% and lower than that of the first vinylidene halide copolymer.

9. A method of producing a multi-layer film comprising a substrate layer of a polyolefin and, on at least one surface thereof, a polymeric heat-sealable layer by
    a) forming a substrate comprising a layer of an oriented propylene polymer having opposed first and second surfaces, and providing thereon,
    b) associated with the first surface of the substrate, a layer of a first vinylidene halide copolymer having a glass transition temperature (Tg) of up to 25° C. and a molecular weight (weight average) not exceeding 135,000, and
    c) associated with the second surface of the substrate, a layer of a second vinylidene halide copolymer having a glass transition temperature (Tg) greater than that of the first copolymer.

* * * * *